United States Patent [19]

Smyre

[11] Patent Number: 5,785,483
[45] Date of Patent: Jul. 28, 1998

[54] BULK STORAGE RECLAMATION SYSTEM AND METHOD

[75] Inventor: Theodore Perry Smyre, Marietta, Ga.

[73] Assignee: Jervis B. Webb Company, Farmington Hills, Mich.

[21] Appl. No.: 651,765

[22] Filed: May 22, 1996

[51] Int. Cl.⁶ .................................................. B65G 65/34
[52] U.S. Cl. ............................ 414/300; 414/313; 414/319
[58] Field of Search .................................. 414/313–322, 414/293, 296, 299, 300, 786, 304; 198/518

[56] References Cited

U.S. PATENT DOCUMENTS

| | | | |
|---|---|---|---|
| 772,956 | 10/1904 | Patterson | 414/317 |
| 892,593 | 7/1908 | Keller | 414/313 |
| 1,026,444 | 5/1912 | Hunt | 198/518 X |
| 2,003,417 | 6/1935 | Andreas | 414/293 X |
| 2,735,591 | 2/1956 | Branchflower | 414/313 X |
| 2,736,439 | 2/1956 | Mercier | 414/292 |
| 2,965,248 | 12/1960 | Saxe | 198/518 |
| 3,063,581 | 11/1962 | Bruecker | 414/318 |
| 3,270,896 | 9/1966 | Sackett, Sr. | 414/21 |
| 3,334,759 | 8/1967 | Ludwig | 198/518 X |
| 3,587,825 | 6/1971 | Smith | 198/518 |
| 3,672,518 | 6/1972 | Andersson | 414/317 |
| 3,842,993 | 10/1974 | Hagen | 414/313 X |
| 4,042,129 | 8/1977 | Hampton | 414/313 |
| 4,146,144 | 3/1979 | Johansson | 414/313 X |
| 4,252,493 | 2/1981 | Ilse | 414/573 |
| 4,544,316 | 10/1985 | Herslow | 414/320 X |
| 4,744,459 | 5/1988 | Ryan | 198/508 |
| 5,099,983 | 3/1992 | Valdez et al. | 198/518 X |
| 5,173,277 | 12/1992 | Montgomery et al. | 423/92 |
| 5,248,342 | 9/1993 | Montgomery et al. | 134/7 |

FOREIGN PATENT DOCUMENTS

| | | | |
|---|---|---|---|
| 3514888 | 11/1986 | Germany | 414/317 |
| 293339 | 12/1953 | Switzerland | 414/313 |

OTHER PUBLICATIONS

Compact Design of Flue Gas Desulphurizaton Gypsum Dewatering Storage and Handling Equipment, Bulk Solids Handling vol. 9, Feb. 1989.

Advantages Of the Euro–Mammoth Silo For the Covereage Storage Of Bulk Solids, F.J.C. Rademacher, The Netherlands.

Dimensioning of Bulk Solid Distribution and Reclaim Screws For Euro–Mammoth Silos, F.J.C. Rademacher, the Netherlands.

*Primary Examiner*—David A. Bucci
*Attorney, Agent, or Firm*—Dickinson Wright PLLC

[57] ABSTRACT

The present invention is a bulk storage facility having a reclaim system for providing a continuous controlled feed of difficult to handle cohesive materials characterized by their tendency to pack together to form relatively self-sustaining walls which are substantially resistant to avalanching. The system comprises a reclaimer that passes over the top surface of a mound of material collecting an infinitely variable depth of material and conveying the material outwardly to a collection conveyor located at the periphery of the mound's base.

4 Claims, 1 Drawing Sheet

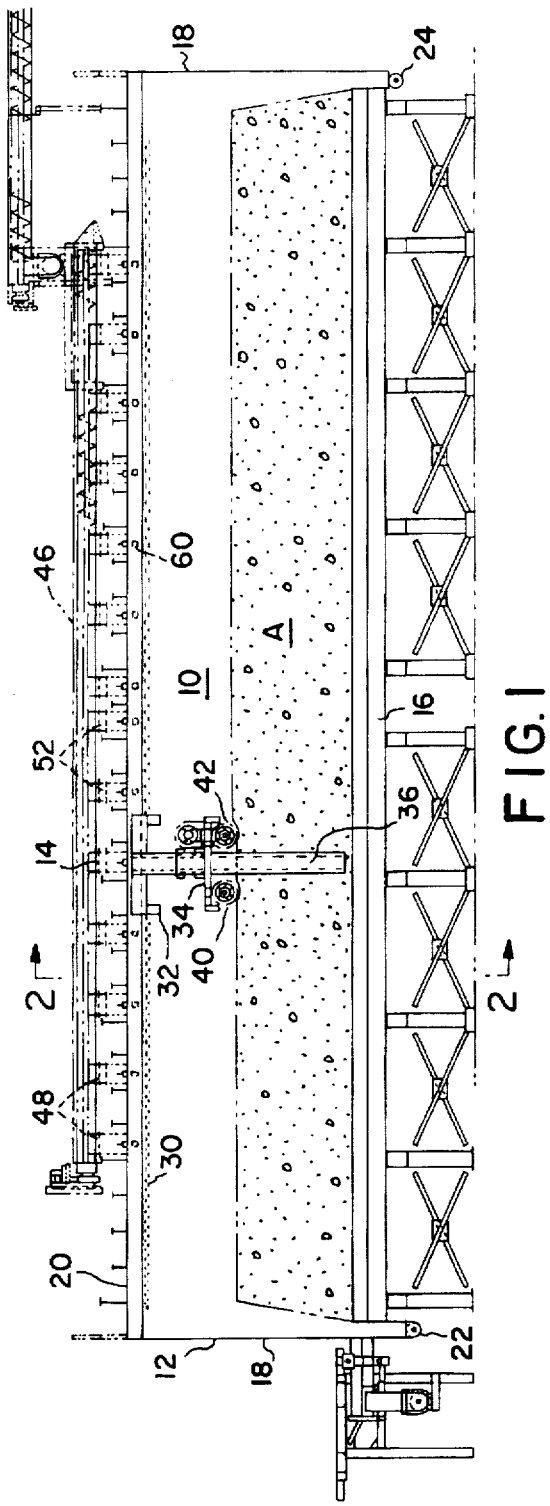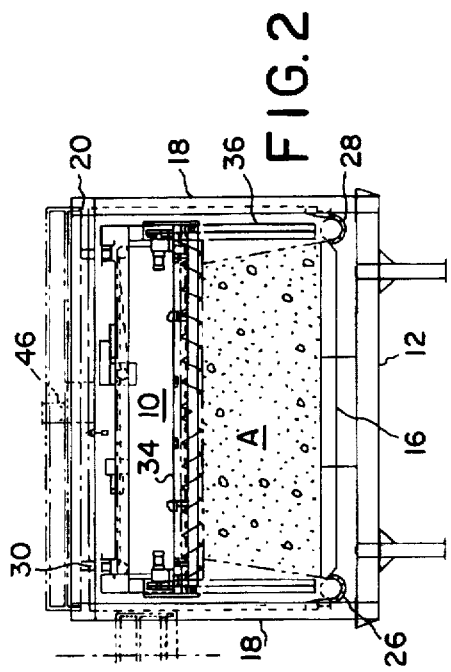

BULK STORAGE RECLAMATION SYSTEM AND METHOD

FIELD OF THE INVENTION

This invention relates to material storage and reclamation systems and a method for the same. More particularly, this invention relates to a system for housing and reclaiming free standing piles of cohesive material, e.g. lead containing materials, by reclaiming material from the top of the pile and forwarding the material to a collection area along the bottom edge of the pile inside the housing.

BACKGROUND OF THE INVENTION

As environmental knowledge and standards have increased, the need to recycle materials in a manner that minimizes environmental contamination has received greater attention. These environmental problems have increasingly become important in connection with the recycling of lead storage batteries. The separation and recovery of lead from the other materials and components in a battery without producing secondary contamination through windblown lead contaminated dust or discharge of lead contaminated storm water has presented many challenges.

These lead recovery facilities require bulk storage of lead material which heretofore has presented many material handling problems due to the unique properties of lead. Lead is an extremely dense cohesive material that readily packs into a self-supporting mass.

The traditional methods for bulk storage of material using reclaim material handling equipment operating on the top of the pile are ineffective for cohesive materials, for instance lead containing material. These conventional systems reclaim material from the top surface of the pile and convey them either outwardly through a perforated retaining wall or inwardly to a vertical channel for collection by a conveyor. Both of these methods are limited to materials that are relatively free-flowing and, thus, not practical for cohesive materials.

Similarly, storage facilities that reclaim material from the bottom of the pile are ineffective. The difficulty in reclaiming lead containing material from the bottom of the pile are two-fold. First, the equipment would be under considerable stress and strain caused by the extreme weight of the material. Second, the material at the bottom would be very tightly packed as a result of the compression force imposed by the upper portion of the pile. Accordingly, it is an object of the present invention to provide a system for reclaiming lead containing materials from bulk storage.

It is another object of the present invention to provide a system for reclaiming materials from the top surface of a free standing storage pile.

It is yet another object of the present invention to provide a system for reclaiming high density environmentally hazardous materials from an enclosed storage facility.

It is still another object of the present invention to provide a system for reclaiming material from a free standing pile to a collection area at the base of the pile in an environmentally isolated housing.

It is a further object of the present invention to provide an environmentally sealed system for storing and reclaiming environmentally hazardous cohesive and/or agglomerating materials having a reclaimer that removes material from a surface of the storage pile and directs it to a collection area along the base of the pile.

It is yet a further object of the present invention to provide a system for storing and reclaiming cohesive and/or agglomerating materials in an environmental enclosure wherein the stored materials are not in contact with the walls of the enclosure.

It is still a further object of the present invention to provide a method of reclaiming materials that characteristically form self-sustaining walls that are relatively resistent to avalanching.

It is even a further object of the present invention to provide an environmentally enclosed system for storing and reclaiming cohesive and/or agglomerating materials in a plurality of hoppers wherein the system provides a continuous feed stream of reclaimed material.

These and other objects of the present invention will become readily apparent after studying and understanding the present invention, as hereinafter described.

SUMMARY OF THE INVENTION

The present invention is a bulk storage facility having a reclaim system for providing a continuous controlled feed of difficult to handle cohesive materials characterized by their tendency to pack together to form relatively self-sustaining walls which are substantially resistant to avalanching. The system in one embodiment comprises a free standing pile of material, a reclaimer and a collection conveyor located along at least a portion of the periphery of the pile's base. The reclaimer passes across a surface of the pile removing an infinitely variable depth of material and directing the material to a point where it can freely fall into the collection conveyor. The collection conveyor conveys the reclaimed material to a feed point for further processing.

Another embodiment of the present invention comprises an enclosure for preventing any substantial portion of the stored material from being released into the environment either in the form of windblown dust, contaminated storm runoff, fumes or the like. The length and width of the enclosure are sized, taking into account the angle of repose of the material, so that the material may form a free standing pile that is unsupported by the sides of the enclosure when piled to the maximum height permitted by the enclosure.

The enclosure is equipped with a tram and reclaimer assembly suspended from the interior of the roof. The tram extends the length of the enclosure and the reclaimer extends the width of the enclosure. The tram is horizontally mounted along the roof and the reclaimer is adjustably attached to the tram. The tram and reclaimer assembly is capable of traversing back and forth above the length of the floor and adjusting the elevation of the reclaimer above the floor. These combined movements enable the reclaimer to reclaim substantially all material in the enclosure.

The reclaimer comprises two screw conveyors mounted in a horizontal plane that extend horizontally across the width of the enclosure. The two screw conveyors enable the reclaimer to reclaim material in both the forward and backward directions. The screw conveyors have oppositely directed flighting on each half of the screw. This opposed flighting enables the reclaimer to simultaneously move material toward opposite sides of the pile where it falls freely to the floor. The floor of the enclosure is surrounded by a system of four screw conveyors that collect and transport the reclaimed material to a point outside the enclosure.

BRIEF DESCRIPTION OF THE DRAWINGS

FIG. 1 is an elevation view of one embodiment of the present invention.

FIG. 2 is a section view along line 2—2 of FIG. 1.

DETAILED DESCRIPTION OF THE INVENTION

Before the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

FIGS. 1 and 2 illustrate one embodiment being representative for illustrative purposes only. The storage and reclaiming system 10 includes an enclosure 12 with a floor 16, four side walls 18, and a roof 20 for housing a free standing pile of material A. The types, quantities, arrangements, shapes, materials of construction and dimensions of the enclosures will vary depending on the particulars of the application.

The floor 16 is surrounded by a series of conveyors, 22, 24, 26, and 28, positioned about the perimeter of the floor adjacent to the walls or between the edge of the floor and the inside of the walls 18. The conveyors may be of any type suitable for this purpose including screw, endless belt or combinations of these. The conveyors are positioned to collect material that falls beyond the side wall of the pile and carry it to another location. Typically, this will be to and/or through a series of conveyors to a point that combines all the reclaim material from this and, optionally, other enclosures.

The material A may be any material that forms a free standing pile requiring no vertical support. Typically, the material will be a cohesive material that tends to pack or stick under storage conditions. More typically, the material will be of the type that is resistant to avalanching, meaning the edge of the top surface remains essentially intact as material passes over the edge. Preferably, the materials will include clay, compost, solid waste, refuse derived fuel (solid waste, i.e., shredded garbage), sludge, galena, flue gas desulphurization dust, potassium nitrate, titanium dioxide, zinc oxide and the like. More preferably, the materials will include lead containing materials, for instance lead sulfate, lead oxides, lead carbonate, metallic lead and mixture thereof.

The enclosure 12 is equipped with a tram and reclaimer assembly 14 comprising: a tram rack 30 extending the length of the enclosure, a truck 32 suspended from the rack 30 and a reclaimer 34 adjustably mounted on the truck 32. The rack 30 is mounted substantially horizontally about the center of the roof 20 on the inside of the enclosure 12. The truck 32 has a downwardly directed mast 36. The truck 32 can travel the length of the enclosure along the rack 30. The reclaimer 34 is adjustably mounted on the truck's mast 36 enabling the elevation of the reclaimer above the floor 16 to be changed. The reclaimer 34 extends approximately the full width of the enclosure 12, as best viewed in FIG. 2. The combination of the traversing movement of the truck with the elevational movement of the reclaimer enable the reclaimer to address virtually the entire interior of the enclosure.

The reclaimer 34 is equipped with two reclaiming screws, 40 and 42, that extend essentially the width of the floor 16. The two screws are rotatably attached to the reclaimer in an approximately horizontal plane. The two screws enable the reclaimer to reclaim in both a forward and a backward direction. The screw on the leading edge of the reclaimer, with respect to the direction of travel, is powered during reclaiming. The screw on the trailing edge remains idle.

It will be appreciated that the reclaimer and truck assembly 14 may be substituted by any device or system that can be moved about the surface of the pile removing a controlled quantity of material from the pile and directing it toward at least one edge of the pile. This may include a blade, plow, rack, brush, blower, or the like.

The screws, 40 and 42, of the present embodiment, as depicted in FIG. 2, have from essentially the middle of the screw and extending the length of the screw toward one end righthand flighting and on the opposite side, extending toward the opposite end, left hand flighting. This facilitates the movement of the removed material toward the sides of the pile as the reclaimer traverses the length of the pile. The screws are substantially open on the bottom. The unremoved surface of the material assists in retaining the removed material within the cylinder, defined by the screw, as the material moves along the length of the screw across the upper surface of the pile. When the material is moved beyond the edge of the upper surface of the pile, the material separates from the screw and falls freely along the side of the pile to a lower portion of the pile, the floor and/or into the floor conveyors, 26 and 28. Since the pile is free standing, the material moves freely in the open space between the side of the pile and the walls of the enclosure. Similarly, at the ends of the pile, any material that has been carried forward by the reclaimer is collected by the floor conveyors, 22 and 24.

Returning to FIG. 1, the top of the enclosure is equipped with a feed system 46 for supplying material for storage in the enclosure. The feed system 46 is mounted longitudinally across the top of the enclosure 12. This feed system comprises a plurality of feed points 48 equipped with discharge valves 52 distributed along the center of the enclosure. This feed system can be controlled so that the material A is drop fed into the enclosure to form a relatively uniform contiguous free standing pile along the length of the enclosure.

The system can be additional equipped with instrumentation and controls. For instance, each discharge valve 52 could optionally be equipped with limit switches indicating the open/closed state of the valve and an actuator for switching the state of the valve. Each feed point 48 could optionally be equipped with a level indicator 60 providing indication of the elevation of the pile at that point. These devices could be combined into a control system that manipulates the discharge valves in response to the level indicators to evenly distribute the material about the enclosure. In addition, the collection conveyor system could be equipped with a mass flow indicator, for instance a weigh indicator, to monitor the amount of material being reclaimed.

In operation, the storage material is fed to a storage convey system that directs the material to a selected hopper distribution conveyor located at the top of a specific closed roof hopper. The distribution conveyor is controlled to distribute material into the hopper through a plurality of discharge valves, distributed along the top center of the hopper, to form a reasonably uniform contiguous pile of material in the hopper. Once this hopper is filled to a desired height, the storage convey system is directed to another hopper distribution conveyor. At this point, the material will be in the form of a long pile, or series of piles, distributed along the longitudinal center of the hopper and the edges of the pile, or piles, will be setback from the walls of the hopper.

A reclaimer is used to reclaim the material from the hopper. The reclaimer is adjusted so that it will contact the top surface of the pile. A tram will move the reclaimer over the length of the pile. As the reclaimer contacts the surface of the material, it will remove a portion of the material and move it toward the side edge of the pile. At the point where the material reaches the side edge of the pile, it falls freely from the reclaimer down the side of the pile. Although the profile of the pile may be altered during the reclaiming operation, the pile remains a free standing pile setback from the walls of the hopper throughout the process.

Once the tram completes one pass, the reclaimer is repositioned, indexed down, in preparation for the return pass. The amount of material reclaimed is controlled by the depth of layer being removed from the pile, as determined by the elevation of the reclaimer, and the traveling speed of the truck. As the truck moves the other direction, the reclaiming screw on the leading edge is energized and the one on the trailing edge is stopped.

As this process continues, material is deposited into a set of collection conveyors located along the periphery of the hopper floor. These collection conveyors convey the reclaimed material to a continuous feed conveyor. Since the feed conveyor receives material from several hoppers, the system is able to provide a substantially continuous stream of reclaimed material by alternately switching hoppers between filling and reclaiming.

What is claimed is:

1. A system for storing and reclaiming material comprising:

a housing substantially enclosing said material having at least one side wall and a floor, wherein said housing is equipped with at least one conveyor on or in said floor positioned adjacent to a free standing pile of said material supported by said floor and said wall;

a feed system for forming said pile in said housing, wherein said pile is spaced apart from said side wall; and a reclaimer for removing a portion of said material from an upper surface of said pile and moving said material to at least one edge of said upper surface where said material freely falls to said conveyor wherein said reclaimer comprises:

a horizontal support arm having first and second ends and mounted for linear movement in a horizontal direction;

first and second masts depending from said first and second ends; and at least one conveyor connected between said first and second masts for vertical movement with respect to the support arm.

2. The system of claim 1 wherein said first and second masts extend from said horizontal support arm to a location closely spaced from said floor.

3. The system of claim 1 wherein said first mast is positioned over said at least one conveyor.

4. The system of claim 1 including a truck for supporting said reclaimer for movement in said horizontal direction.

* * * * *